June 18, 1963 T. R. ALLEY 3,094,307
CIRCULATING VALVE
Filed Jan. 15, 1960

Thomas R. Alley
INVENTOR.

BY Hayden & Pravel

ATTORNEYS

United States Patent Office 3,094,307
Patented June 18, 1963

3,094,307
CIRCULATING VALVE
Thomas R. Alley, 341 Erin St., Houston, Tex.
Filed Jan. 15, 1960, Ser. No. 2,711
6 Claims. (Cl. 251—297)

The present invention relates to a circulating valve and more particularly to an improved form of circulating valve.

At the present time valve devices are used in conduits positioned in well bores for controlling the flow of fluids through ports in the conduit. However, the present valve devices employed, by reason of their construction and function, are disadvantageous for several reasons.

First of all, sleeve valves or so-called circulating valve constructions presently employed are not designed so that they will remain in a desired predetermined position to open or to close the ports in the flow string for controlling fluid flow therethrough. This is undesirable because in some circumstances it is necessary to keep the valve in a position so as to close off flow through the ports while a well tool such as a swab or the like is moved through the conduit. If the sleeve valve cannot be locked so as to maintain the ports closed off as the swab tool is moved through the conduit, then the desirable effects of using the swab tool will be vitiated.

Another disadvantage with circulating valves of the sleeve type presently used is that fluid flow through the ports in the conduit tends to cut out or wash out the seals between the conduit and valve thereby rendering the valve ineffective to positively close off flow through the ports after it has been actuated several times.

The present invention is directed to a circulating valve of the sleeve type which is adapted to be positioned or carried by a ported conduit, and which may be locked at desired predetermined positions relative to the ported conduit to either open the ports or close the ports through the conduit for controlling the fluid flow through the ports. The present invention also contemplates a circulating valve arrangement wherein the seal means are protected at all times against cutting out by fluid flow through the ports, thus greatly increasing the life of the valve.

Still another object of the present invention is to provide a circulating valve of the sleeve type which may be positioned relative to a ported conduit for controlling the flow through the ports in the conduit, there being means associated with the valve for holding it in a predetermined position to either open the ports for flow therethrough, or to close the ports to prevent flow therethrough.

Still another object of the present invention is to provide a circulating valve construction which includes a valve means and a ported conduit which carries the valve means whereby the valve means may control the flow through the ports in the conduit, there being seal means spaced on each side of the port means for sealing off between the conduit and the valve means, and additional means to protect the seal means from cutting out when the valve means is moved to open the ports for fluid flow therethrough.

Yet a further object of the present invention is to provide a circulating valve construction which enables a swab tool to be run in the flow string of a well bore and maintains ports in the flow string closed off to flow so that the swab tool may perform its desired functions in the flow string without actuating the valve to move into open position.

Yet a further object of the present invention is to provide a circulating valve construction which incorporates means for equalizing the fluid pressure across seal means in the construction to inhibit cutting out of the seals by fluid flow through the valve.

Still another object of the present invention is to provide in a circulating valve for closing off ports in the flow string of a well bore which valve has seal means to seal off in the valve construction, follower means movable when the valve moves to open the ports for flow therethrough to protect the seal means from the fluid flow to inhibit cutting out or wearing thereof by the fluid flow.

Other objects and advantages of the present invention will become apparent from a consideration of the following description and drawings wherein.

Figure 1:
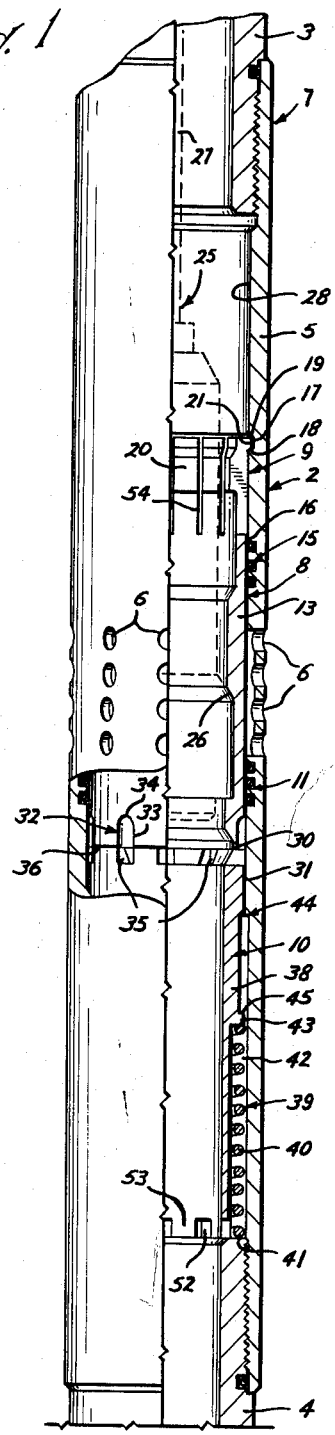
FIG. 1 is a one-quarter vertical sectional view illustrating the circulating valve arrangement of the present invention, with the valve means positioned for closing off flow through the ports in the conduit, and a portion of the conduit being cut away to better illustrate the pressure equalizing means in the valve.

In FIG. 1 the circulating valve arrangement of the present invention is designated generally by the numeral 2 and includes the ported conduit 5 which is shown as being engaged with the tubular member 3 at its upper end as shown in FIG. 1, and is connected at its lower end to the tubular member 4. The tubular members 3 and 4 and the ported conduit 5 form part of a flow string which is adapted to be positioned in a well bore to conduct well fluids from a producing zone to the earth's surface. The conduit 5 which is connected in the flow string and to the members 3 and 4 illustrated in FIG. 1 of the drawings, is provided with ports 6 therein whereby fluid from the producing zone of the well bore may flow through the ported conduit 5 and into the flow string designated generally by the numeral 7 whereby the well fluid may then be conducted upwardly in the flow string to the earth's surface.

It can be appreciated that the present invention is described in detail as being positioned in the flow string, or production string of a well bore; however, it can be appreciated that the present invention can be as readily positioned in a casing, liner or any other tubular member, and may be used for controlling flow through ports in the tubular members.

The arrangement designated generally by the numeral 2 also includes the valve means designated generally at 8 for controlling flow through the ported conduit 5 of the arrangement and the lock means or holding means 9 for positioning the valve 8 in the conduit 5.

Additionally, means as represented generally by the numeral 10 are also provided for protecting the seal means 11 on one side of the port means 6, which seal means 11 is uncovered as the valve means 8 moves from closed to open position as will be described in greater detail hereinafter.

Figure 2:
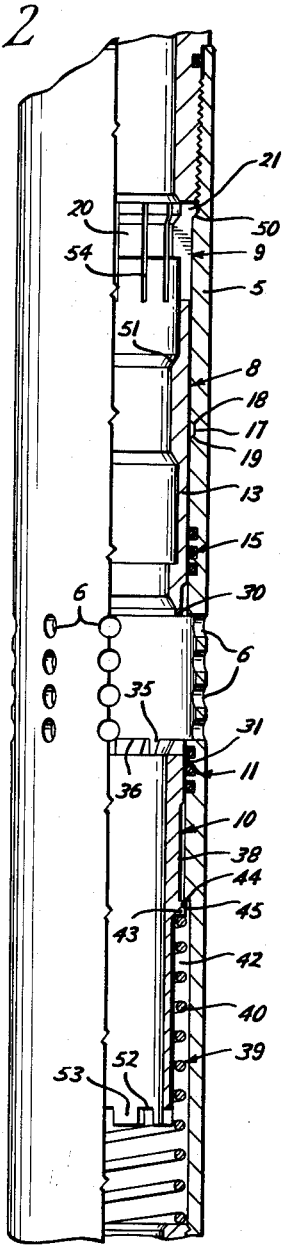
FIG. 2 is a quarter vertical sectional view showing the valve means moved to open the ports in the conduit for flow therethrough, and the follower means actuated to cover the seal means in the circulating valve arrangement to inhibit damage thereto.

When the valve means 8 is in the position illustrated in FIG. 1 of the drawings, the ports 6 are closed so that flow through the ports 6 of the conduit 5 is prevented, and when the valve means 8 has been moved in the conduit 5 to the position as illustrated in FIG. 2 of the drawings, then the ports 6 will be uncovered, or will be open so that fluid flow may occur therethrough and through the valve means 8 to the earth's surface.

The locking means is provided for holding the valve means 8 in predetermined longitudinal positions in the conduit 5 until a predetermined longitudinal force has been exerted on the valve means to move it to a desired position. This prevents premature release or actuation of the valve.

As can be seen from FIGS. 1 and 2 of the drawings, the valve means 8 comprises a tubular member or sleeve valve 13 which is carried by the ported conduit 5. As illustrated in FIGS. 1 and 2 of the drawings, and as most often used, the sleeve valve 13 will be carried internally of the conduit 5; however, under some circumstances the construction may be modified to mount the sleeve valve 13 externally of the ported conduit 5 if desired. The tubular member 13 is of suitable length to span the port 6 in the conduit 5 when the sleeve valve 13 is seated in the conduit as illustrated in FIG. 1 of the drawings so that flow through the port means 6 is shut off.

The seal means 15 carried in the ported conduit 5 on one side of the ports 6, and the seal means 11 carried by the ported conduit 5 on the other side of the ports 6 seal off between the conduit 5 and sleeve valve 13 to prevent flow through the ports 6 when the sleeve valve is seated as shown in FIG. 1 of the drawings. In this regard, it will be noted that the tubular valve 13 is of sufficient axial extent so that the seal means 15 as well as the seal means 11 engages or contacts an uninterrupted outer surface portion 16 of the tubular valve 13 on the sleeve valve 13 to form a continuous seal therewith.

The locking means 9 as illustrated includes the annular groove 17 in the ported conduit 5 which is provided with suitably tapered or shaped walls 18 and 19 on each side thereof. The tubular valve 13 is provided with longitudinally extending fingers 20 which fingers 20 are provided with projections 21 on the upper end thereof which are shaped to conform with the groove 17 and engage therewith when the tubular valve 13 is seated to close off flow through the flow ports 6. The fingers 20 by reason of engagement of their projections 21 within the grooves 17 serve to lock or hold the valve means 8 in position in the ported conduit 5, and the amount of force necessary to move the tubular valve 13 longitudinally relative to the conduit 5 may be determined by the size and arrangement of the fingers 20.

The fingers 20 are formed by a plurality of longitudinally extending slits 54 which are circumferentially spaced to define the fingers of predetermined width. The length of the slits 54 and their circumferential spacing, cooperate to determine the longitudinal force necessary to collapse the fingers 20 to disengage them from the groove 50, or from the groove 17, to move the valve longitudinally of the ported conduit 5.

With circulating valve or sleeve valve constructions heretofore used, it has been extremely difficult to retain them in a desired position to either open or to close the ports in a flow string while manipulating tools in the tubular member in which the valve is carried. Under some circumstances it is extremely desirable, if not necessary, to maintain the circulating valve in a position to close off flow through the ports 6 as certain well operations are performed. For example, when moving a swabbing tool through the flow string, it is desirable to retain the flow ports 6 in the string sealed off so that the swabing action in the flow string may have its maximum effect on a desired area of the well bore. However, with circulating valves heretofore used, their construction is such that it is extremely difficult, if not impossible, to move any sort of a tool through the valve because the valve construction blocks or reduces the size of the internal bore of the flow string. On the other hand, where the circulating valves of the prior art are not of a construction to reduce the internal bore of the flow string, then there has been no suitable locking means provided for holding or retaining them in position as the swabbing tool is moved therethrough. Under these circumstances, the swabbing tool serves to actuate the circulating valve and to move it so that the flow ports 6 are open, and this is extremely undesirable as it nullifies the effect of the swabbing action in the flow string.

The locking means designated generally at 9 including the fingers 20, the projections 21 thereon, and the groove 17 in which the projections 21 fit overcome this problem in that by varying the size and configuration of the groove 17, and by varying the size and number of fingers 20, and the length of slits 54, it is possible to provide a holding or locking means which will withstand the action of the swab tool thereon and which will not function until a predetermined longitudinal force is applied thereagainst.

Such arrangement has the additional advantage of aiding the operator at the surface of the well bore to position a valve which operates at a known longitudinal force at a desired position in the well bore, and therefore it is possible to control which circulating valve is opened at any given time, since the valve will not actuate until a predetermined longitudinal force is applied thereagainst. Thus, the well operator can manipulate the actuating tool so that he will know with a greater certainty which circulating valve means 8 has been actuated in the flow string 7.

The valve means 8 is adapted to be moved longitudinally by any suitable means such as the actuating device designated generally by the numeral 25. The device as represented by the numeral 25 is well known to those skilled in the art at the present time, and such tools are offered for sale or rental by several companies, and it is therefore believed unnecessary to give a detailed description of the operation and function of this tool. The tool 25 is adapted to be lowered into the well bore and engages on a shoulder such as that illustrated at 26 of FIG. 1 so that the valve means 8 may be moved longitudinally of the conduit 5 when a predetermined upward pull is exerted on the tool 25 by means of the cable or pipe string 27 which extends upwardly to the earth's surface. As an upward pull is exerted on the cable or pipe 25, the fingers 20 are collapsed radially and inwardly so that the projections 21 disengage from the annular groove 17. The projections 21 will then ride on the inner surface 28 of the conduit 5 as the tubular valve member 13 is moved longitudinally therealong.

As the valve member 13 is moved longitudinally of the conduit 5, the follower means 10 is urged into engagement with the lower end 30 of the sleeve valve and as the end 30 of the sleeve valve 13 uncovers the seal means 11, the external surface 31 of the means 10 will immediately cover such seal means, thereby preventing fluid flow from washing the seal means 11 out of their seat in the conduit 5.

It will be noted that the construction of the present invention is such that when the valve member 13 is moved to uncover ports 6, the flow is directly into the conduit and the seals means 11 and 15 are still protected.

To further aid in preventing damage to the seal means 11, a plurality of circumferentially spaced pressure equalizing means 32 are provided on the lower end of the tubular valve member 13. The pressure equalizing means 32 are in the form of grooves 33 which extend longitudinally of the tubular valve member 13 and are circumferentially spaced about the lower end thereof. The grooves 33 have side surfaces which merge at their inner end as illustrated at 34 and as such grooves move across the seal means 11 flow from the ports 6 will be first conducted therethrough whereby the pressure on each side of the seal means will be equalized prior to the time that the lower end 30 of the valve member 13 uncovers the seal means. A plurality of circumferentially spaced openings 35 are provided at the upper end 36 of the follower 10 to receive the fluid flow from the pressure equalizing means 32.

The follower means 10 is illustrated as including the sleeve 38, and it will be noted that the sleeve 38 is provided with means designated generally at 39 for urging the sleeve 38 longitudinally of the conduit 5 in the direction in which the valve member 13 is moved when the flow ports 6 are to be opened for flow therethrough. The upper end 36 of the sleeve 38 and the lower end 30 of the tubular valve 13 engage, and as the tool 25 moves the sleeve valve 13 longitudinally of the conduit 5, the means 39 continually urges the sleeve 38 upwardly and in contact with the lower end 20 of the sleeve valve 13. Therefore, as the sleeve valve 13 moves across the seal means 11 the pressure is equalized thereacross by means of flow through grooves 33, and thereafter uncovers such seal means, whereupon the seal means will be simultaneously covered by the surface 31 on the sleeve 38. This prevents damage to the seal means 11 and prevents them from being washed out by fluid flow through the port means 6. The sleeve 38 is illustrated in its final position in FIG. 2 of the drawings, and it will be noted that the outer surface 31 of the sleeve 38 covers the seal means 11 so as to protect the seal means 11, and the upper end 36 of the sleeve 38 terminates at a point so as to not interfere with flow through the ports 6.

The means 39 are illustrated as being in the form of a coil spring 40 which rests on the lower shoulder 41 and fits within the annular space 42 surrounding the sleeve 38. The spring 40 engages the lower edge of annular shoulder 43 on the external surface of the sleeve 38 and is under compression when the valve 8 and the follower means 10 are assembled in the conduit 5 as illustrated in FIG. 1 of the drawings. Thus, the spring 40 tends to continually urge the sleeve 38 longitudinally of the conduit 5 at all times, but is restrained against longitudinal movement by reason of the valve 8 which engages thereagainst.

An annular shoulder 44 in the conduit 5 forms a stop means for engaging the upper surface 45 on the shoulder 43, and engagement of the shoulder 43 with the surface 45 limits the longitudinal movement of the sleeve 38 in the conduit 5.

The seals 11 and 15, of the present invention, are not moved across any ports, nor are they unprotected and fully exposed to fluid pressure so that damage thereto, or cutting out of the seals is greatly reduced, if not completely eliminated.

The sleeve valve means 8 is moved longitudinally of the conduit 5 until the projections 21 on the fingers 20 engage in the groove 50. This serves to hold or lock the valve means 8 in open position until the actuating tool 25 is again lowered into the well bore so as to engage any suitable surface such as the shoulder 51 on the valve means 8 and to apply a downward force thereagainst to move the sleeve valve 13 downwardly to close off the ports 6. When the lower end 30 of the sleeve valve 13 engages the upper end 36 of the sleeve 38, the sleeve 38 will be collapsed to its original position as illustrated in FIG. 1 of the drawings. Openings 52 are provided in the lower end 53 of the sleeve so that fluid or debris will not be trapped within the annular space 42 around the sleeve 38 as the sleeve moves to its original position.

Particular attention is directed to the fact that since the valve means 8 does not have any portion thereof substantially reduced relative to the internal bore of the flow string 7, well tools may be moved through the valve means 8 without interference. Additionally, since the locking means 9 holds the valve in a predetermined position, the movement of such well tools through the valve means 8 will not actuate the valve means prematurely.

Additionally, the seal means 11 which is uncovered by the sleeve valve 13 is protected at all times whether the valve is open or closed, and the seal means 11 is further protected by reason of the pressure equalizing means 32 on the sleeve valve 13.

The seal means 11 and 15 may be of any suitable type such as O-rings and the like.

Broadly the present invention relates to a circulating valve, and more particularly to an improved form of circulating valve arrangement.

What is claimed is:

1. In a sleeve valve arrangement wherein a sleeve valve having an unrestricted passage longitudinally thereof from end to end, and which valve is carried by a ported conduit and movable relative to the conduit to open and close the ports for flow through the ports of the conduit and through said unrestricted passage in said sleeve valve, and wherein seal means are carried by the conduit on each side of the ports to seal off between the conduit and sleeve valve when the sleeve valve is positioned to close off flow through the ports, the seal means on one side of the ports being covered by the valve when it is in position to close off flow through the ports and also when the sleeve valve is moved to open the ports for flow therethrough, and the seal means on the other side of the ports being covered by the valve when it is in position to close off flow through the ports but not covered by the valve when the valve is moved to open the ports for flow therethrough, the invention comprising, means carried by the conduit and movable longitudinally of the conduit as the valve is moved to cover the seal means which are uncovered by movement of the valve to protect them from fluid flow, means in the sleeve valve to equalize the pressure across the seal means uncovered as the sleeve valve is moved to open the ports for flow therethrough, and means normally urging said seal covering means longitudinally of the conduit in the direction in which the sleeve valve is moved to open the ports so that when the sleeve valve is moved longitudinally to open the ports, said seal covering means abuts and follows the sleeve valve to cover the seal means as they are uncovered by the sleeve valve.

2. The combination recited in claim 1 wherein said urging means comprises a spring carried by the conduit.

3. In a sleeve valve arrangement wherein a sleeve valve having an unrestricted passage longitudinally thereof from end to end, and which valve is carried by a ported conduit and movable relative to the conduit to open and close the ports for flow through the ports of the conduit and through said unrestricted passage in said sleeve valve, and wherein seal means are carried by the conduit on each side of the ports to seal off between the conduit and sleeve valve when the sleeve valve is positioned to close off flow through the ports, the seal means on one side of the ports being covered by the valve when it is in position to close off flow through the ports and also when the sleeve valve is moved to open the ports for flow therethrough, and the seal means on the other side of the ports being covered by the valve when it is in position to close off flow through the ports but not covered by the valve when the valve is moved to open the ports for flow therethrough, the invention comprising, means carried by the conduit and movable longitudinally of the conduit as the valve is moved to cover the seal means which are uncovered by movement of the valve to protect them from fluid flow, means in the sleeve valve to equalize the pressure across the seal means uncovered as the sleeve valve is moved to open the ports for flow therethrough, and additional means carried by said seal covering means to engage the conduit to limit longitudinal movement thereof in the conduit.

4. In a sleeve valve arrangement wherein a sleeve valve having an unrestricted passage longitudinally thereof from end to end, and which valve is carried by a ported conduit and movable relative to the conduit to open and close the ports for flow through the ports of the conduit and through said unrestricted passage in said sleeve valve, and wherein seal means are carried by the conduit on each side of the ports to seal off between the conduit and sleeve valve when the sleeve valve is positioned to close off flow through the ports, the seal means on one side of the ports being covered by the valve when it is in position to close off flow through the ports and also when the sleeve valve is moved to open the ports for flow therethrough, and the seal means on the other side of the ports being covered by the valve when it is in position to close off flow through the ports but not covered by the valve when the valve is moved to open the ports for flow therethrough, the invention comprising, means carried by the conduit and movable longitudinally of the conduit as the valve is moved to cover the seal means which are uncovered by movement of the valve to protect them from fluid flow, means in the sleeve valve to equalize the pressure across the seal means uncovered as the sleeve valve is moved to open the ports for flow therethrough, means normally urging said seal covering means longitudinally of the conduit in the direction in which the sleeve valve is moved to open the ports so that when the sleeve valve is moved longitudinally to open the ports, said seal covering means abuts and follows the sleeve valve to cover the seal means as they are uncovered by the sleeve valve, cooperable means on the conduit and valve for locking the valve in a predetermined longitudinal position in the conduit, and additional means carried by said seal covering means to engage the conduit to limit longitudinal movement thereof in the conduit.

5. In a sleeve valve arrangement wherein a sleeve valve having an unrestricted passage longitudinally thereof from end to end, and which valve is carried by a ported conduit and movable relative to the conduit to open and close the ports for flow through the ports of the conduit and through said unrestricted passage in said sleeve valve, and wherein seal means are carried by the conduit on each side of the ports to seal off between the conduit and sleeve valve when the sleeve valve is positioned to close off flow through the ports, the seal means on one side of the ports being covered by the valve when it is in position to close off flow through the ports and also when the sleeve valve is moved to open the ports for flow therethrough, and the seal means on the other side of the ports being covered by the valve when it is in position to close off flow through the ports but not covered by the valve when the valve is moved to open the ports for flow therethrough, the invention comprising, means carried by the conduit and movable longitudinally of the conduit as the valve is moved to cover the seal means which are uncovered by movement of the valve to protect them from fluid flow, means in the sleeve valve to equalize the pressure across the seal means uncovered as the sleeve valve is moved to open the ports for flow therethrough, means normally urging said seal covering means longitudinally of the conduit in the direction in which the sleeve valve is moved to open the ports so that when the sleeve valve is moved longitudinally to open the ports, said seal covering means abuts and follows the sleeve valve to cover the seal means as they are uncovered by the sleeve valve, and means carried by said seal covering means to engage the conduit to limit longitudinal movement thereof in the conduit.

6. In a sleeve valve arrangement wherein a sleeve valve having an unrestricted passage longitudinally thereof from end to end, and which valve is carried by a ported conduit and movable relative to the conduit to open and close the ports for flow through the ports of the conduit and through said unrestricted passage in said sleeve valve, and wherein seal means are carried by the conduit on each side of the ports to seal off between the conduit and sleeve valve when the sleeve valve is positioned to close off flow through the ports, the seal means on one side of the ports being covered by the valve when it is in position to close off flow through the ports and also when the sleeve valve is moved to open the ports for flow therethrough, and the seal means on the other side of the ports being covered by the valve when it is in position to close off flow through the ports but not covered by the valve when the valve is moved to open the ports for flow therethrough, the invention comprising, means carried by the conduit and movable longitudinally of the conduit as the valve is moved to cover the seal means which are uncovered by movement of the valve to protect them from fluid flow, means in the sleeve valve to equalize the pressure across the seal means uncovered as the sleeve valve is moved to open the ports for flow therethrough, spring means normally urging said seal covering means longitudinally of the conduit in the direction in which the sleeve valve is moved to open the ports so that when the sleeve valve is moved longitudinally to open the ports, said seal covering means abuts and follows the sleeve valve to cover the seal means as they are uncovered by the sleeve valve, and means carried by said seal covering means to engage the conduit to limit longitudinal movement thereof in the conduit.

References Cited in the file of this patent

UNITED STATES PATENTS

| | | |
|---|---|---|
| 2,469,921 | Hoge | May 10, 1949 |
| 2,591,528 | Filstoup | Apr. 1, 1952 |
| 2,606,616 | Otis | Aug. 12, 1952 |
| 2,694,413 | Force | Nov. 16, 1954 |
| 2,723,677 | Middleton | Nov. 15, 1955 |
| 2,747,611 | Hewitt | May 29, 1956 |